(12) United States Patent
Haidar-Daoud et al.

(10) Patent No.: US 9,909,915 B2
(45) Date of Patent: Mar. 6, 2018

(54) DISPENSER

(71) Applicants: Joy Farrah Haidar-Daoud, Lynnfield, MA (US); Abdullah Daoud, Lynnfield, MA (US)

(72) Inventors: Joy Farrah Haidar-Daoud, Lynnfield, MA (US); Abdullah Daoud, Lynnfield, MA (US)

( * ) Notice: Subject to any disclaimer, the term of this patent is extended or adjusted under 35 U.S.C. 154(b) by 0 days.

(21) Appl. No.: 15/026,091

(22) PCT Filed: Oct. 1, 2014

(86) PCT No.: PCT/US2014/058565
§ 371 (c)(1),
(2) Date: Mar. 30, 2016

(87) PCT Pub. No.: WO2015/050949
PCT Pub. Date: Apr. 9, 2015

(65) Prior Publication Data
US 2016/0238424 A1 Aug. 18, 2016

Related U.S. Application Data

(60) Provisional application No. 61/991,908, filed on May 12, 2014, provisional application No. 61/885,036, filed on Oct. 1, 2013.

(51) Int. Cl.
*G01F 11/24* (2006.01)
*G01F 11/00* (2006.01)
(Continued)

(52) U.S. Cl.
CPC ............ *G01F 11/24* (2013.01); *A23L 2/39* (2013.01); *A23L 33/40* (2016.08); *B65D 47/147* (2013.01); *G01F 11/006* (2013.01);
*G01F 11/22* (2013.01); *A23V 2002/00* (2013.01); *B65D 83/06* (2013.01); *B65G 65/4881* (2013.01);
(Continued)

(58) Field of Classification Search
CPC .......... G01F 11/18; G01F 11/22; G01F 11/24; G01F 11/006; G01F 11/003; G01F 15/001; A23V 2002/00; B65D 47/147; B65D 83/06; A23L 33/40; A23L 2/39; B65G 65/4881
See application file for complete search history.

(56) References Cited

U.S. PATENT DOCUMENTS 1,851,044 A * 3/1932 Genovesi ............... A47F 1/035
222/185.1
1,863,133 A * 6/1932 Ziedins .................. G01F 11/24
222/179
(Continued)

FOREIGN PATENT DOCUMENTS

GB 1 228 891 A 4/1971

OTHER PUBLICATIONS

International Search Report and Written Opinion dated Jan. 7, 2015, for International Patent Application No. PCT/US12014/058565, filed Oct. 1, 2014 (8 pages).

*Primary Examiner* — Frederick C Nicolas
(74) *Attorney, Agent, or Firm* — Brown Rudnick LLP

(57) ABSTRACT

The present invention is related to dispensers for dispensing portioned amounts of substances into a container. For example, dispensers for dispensing powered drink mixes, such as baby formula.

8 Claims, 13 Drawing Sheets

(51) Int. Cl.
*A23L 2/39* (2006.01)
*B65D 47/14* (2006.01)
*G01F 11/22* (2006.01)
*A23L 33/00* (2016.01)
*B65G 65/48* (2006.01)
*B65D 83/06* (2006.01)
*G01F 11/18* (2006.01)
*G01F 15/00* (2006.01)

(52) U.S. Cl.
CPC ............ *G01F 11/003* (2013.01); *G01F 11/18* (2013.01); *G01F 15/001* (2013.01)

(56) References Cited

U.S. PATENT DOCUMENTS

| | | | | |
|---|---|---|---|---|
| 1,867,998 A * | 7/1932 | Benson | ................ | B65B 3/32 141/183 |
| 2,047,184 A * | 7/1936 | Gray | ................ | G01F 11/24 222/108 |
| 2,853,172 A * | 9/1958 | Angell | ................ | G07F 11/44 194/350 |
| 2,920,796 A * | 1/1960 | Field | ................ | A47G 19/34 222/185.1 |
| 3,169,675 A * | 2/1965 | Gutzmann | ................ | A47G 19/34 222/185.1 |
| 4,151,933 A | 5/1979 | Myers | | |
| 4,228,930 A * | 10/1980 | Hogan | ................ | F04B 43/1284 222/108 |
| 4,268,205 A * | 5/1981 | Vacca | ................ | B65G 53/4633 222/368 |
| 4,448,331 A * | 5/1984 | Millette | ................ | G01F 11/24 222/185.1 |
| 4,511,067 A * | 4/1985 | Martin | ................ | G01F 11/24 222/230 |
| 5,386,929 A * | 2/1995 | Dutt | ................ | A47G 19/34 222/153.1 |
| 5,702,025 A * | 12/1997 | Di Gregorio | ................ | B65D 47/28 220/714 |
| 5,833,097 A * | 11/1998 | Ruth | ................ | G01F 19/00 141/280 |
| 5,927,558 A * | 7/1999 | Bruce | ................ | A47G 19/34 222/185.1 |
| 6,964,355 B2 * | 11/2005 | Landau | ................ | A47G 19/34 222/185.1 |
| 7,703,639 B2 * | 4/2010 | Landau | ................ | A47G 19/34 222/1 |
| 7,731,063 B2 * | 6/2010 | Rusch | ................ | G01F 11/24 222/306 |
| 7,882,987 B2 * | 2/2011 | Sholem | ................ | G01F 11/18 222/149 |
| 8,002,153 B2 * | 8/2011 | Lowther | ................ | A47G 19/34 222/1 |
| 8,534,507 B2 * | 9/2013 | Gronholm | ................ | G01F 11/24 141/369 |
| 8,905,272 B2 * | 12/2014 | Chan | ................ | G01F 11/20 222/153.13 |
| 9,400,200 B2 * | 7/2016 | Rusch | ................ | G01F 11/24 |
| 2003/0075237 A1 | 4/2003 | Bettiol et al. | | |
| 2011/0101023 A1 | 5/2011 | Chan et al. | | |

* cited by examiner

DISPENSER

RELATED APPLICATIONS

The present application is a 35 U.S.C. §371 national phase application, which claims the benefit of and priority to PCT/US2014/058565, filed Oct. 1, 2014, which claims the benefit of and priority to U.S. Provisional App. No. 61/991,908, filed May 12, 2014, and U.S. Provisional App. No. 61/885,036, filed Oct. 1, 2013, the entireties of each of which are incorporated by reference herein.

TECHNICAL FIELD

This invention relates to devices for delivering a partitioned amount of a substance.

BACKGROUND OF THE INVENTION

While a percentage of parents choose to breast-feed their babies, the majority of parents bottle-feeds their babies within the first year of their life or moves to bottle-feeding for at least one year. Even parents that choose to initially breast-feed their children move towards bottle feeding their infant or toddler when transitioning off a mother's milk. Typically, bottle milk is created by introducing a measured amount of baby formula, which is usually a powdered and/or granular substance, into a bottle with water and mixing the formula/water solution until the formula is dissolved.

It can be a challenge to dispense baby formula into a bottle with both accurate measurements of formula and without making a mess. The challenge can be magnified while holding an unhappy and/or hungry child or in on-the-go situations. Often baby powder is provided in a large container and the proper dose is manually measured with a provided plastic cup or scoop. Because one has to pour the scoop of powder into a narrow baby bottle opening, pouring the proper dose of powdered formula into the bottle can be messy and time consuming. A failure to properly pour powder into the bottle or mismeasure the formula can result in an incorrect ratio of powder formula to water, which could inadvertently result in failing to provide their infant child with the proper nutrition. In addition, the containers often expose humidity to the baby formula, which eventually causes the powder to lump in the formula solution. This can cause problems during feeding because the formula clogs the baby bottle nipple.

Beyond baby formula, various other drink mixes are available in powdered form and require dispending a specific measurement of the powder into a container and mixing a fluid, such as water, with the powder to create the drink. These mix-created drinks can include but are not limited to chocolate milk, punches, sports drinks, and even nutritional specific drinks for the elderly, diabetic, etc.

Accordingly, there is a general need for a convenient dispenser of powdered substances which dispenses more consistently with each use than if you were to scoop the powder yourself.

SUMMARY

The present invention provides a dispenser for dispensing a precise measurement of a substance, such as baby powder and other powdered drink mixes. The dispenser is configured such that a user can hold the dispenser and use a thumb and/or other fingers to rotate an external mechanism that portions a specific amount of substance contained in the dispenser. The specific portion can then be placed directly in a mixing bottle or other container to create a solution, such as a drink. Thus, the dispenser of the invention advantageously allows a user to release/dispense in precise measurements of the substance into a container with the use of one hand.

In one aspect, the dispenser includes an elongate body having a first portion and a second portion, in which an average width of the first portion is less than an average width of the second portion. The elongate body also defines a lumen for holding a substance. The interior of the elongate body is configured to assist in sifting the substance to provide easy dispensing of the substance and to reduce clumping of the substance when mixed with a liquid. The second portion is coupled to a removable bottom configured to couple with second portion. The coupling may be a snap-fit or dual-coupling mechanism. The first portion is associated with a dispensing housing. The dispensing housing includes an external knob, a spout, and a detent. The dispensing housing further includes an internal wheel having an axis and disposed within the dispensing housing such that the internal wheel is in communication with the spout and the lumen of the elongate body. The axis of the internal wheel is perpendicular to a longitudinal axis of the elongate body and a longitudinal axis of the spout. The internal wheel includes a plurality of spaced-apart blades that define cavities for receiving the substance, and an outer edge of each blade is configured to slideably flush against an internal surface of the dispensing housing. The detent is configured to engage with the internal wheel or external knob, during rotation of the internal wheel, to indicate with resistance and sound that one of the cavities is open towards the spout.

DETAILED DESCRIPTION

The present invention provides a dispenser for dispensing a precise measurement of a substance, such as baby powder and other powdered drink mixes. The dispenser of the invention advantageously allows a user to pour in precise measurements with the use of one hand. The dispenser is configured such that a user can hold the dispenser and use a thumb and/or other fingers to rotate an external mechanism that portions an amount of substance that is contained in the dispenser. The measured portion can then be placed directly in a mixing bottle or other container to create a solution, such as a drink.

Figure 1:
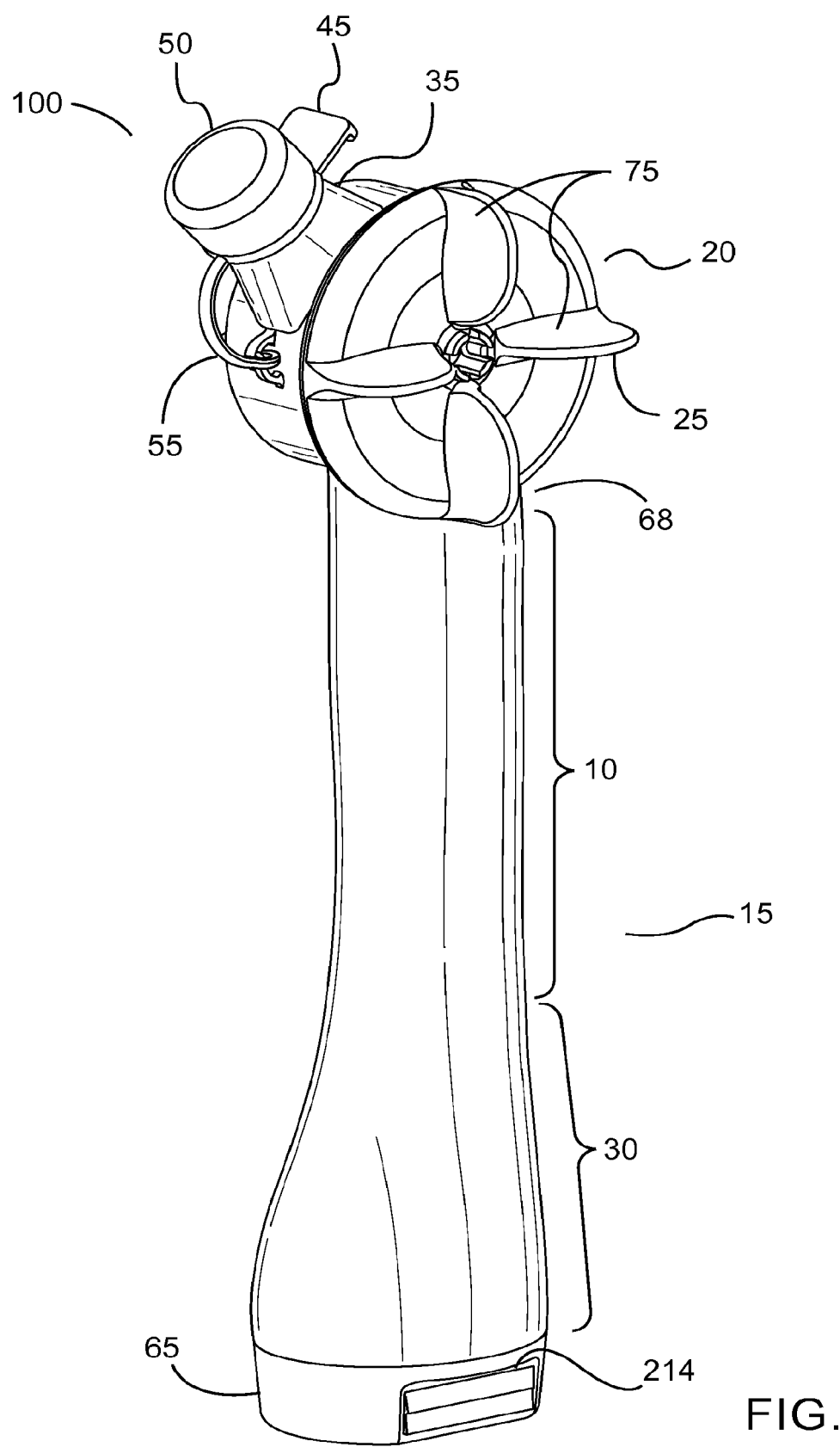
FIG. 1 depicts a dispenser according to one embodiment.

FIG. 1 depicts an embodiment of the dispenser 100. As shown in FIG. 1, the dispenser 100 includes an elongate body 15 and a dispensing housing 20. The elongate body 15 may be coupled to dispensing housing 20, or a distal end of the elongate body 15 may form the dispensing housing 20. The dispensing housing 20 can include a spout 35, an external knob 25, and an internal wheel 40 (see FIG. 2) disposed within the housing for partitioning specific volumes of a substance, such a formula, out of the spout 35. The external knob 25 can be engaged by a user to rotate the internal wheel 40 in order dispense a powdered substance of a certain volume out of the spout 35. The spout 35 can be operably associated with a cap 50. The cap 50 can include a tab 45 that can be pulled by a user to remove the cap 50 off the spout. The cap 50 can be a push cap that fits onto the spout due to resistance, a screw cap, or any other cap known in the art. In addition, the cap can optionally be attached to the dispenser via an attachment member 55.

As further shown in FIG. 1, the elongate body 15 of the dispenser defines a longitudinal axis and has a first portion 10 and a second portion 30. In certain embodiments, the average width of the first portion 10 is smaller than the average width of the second portion 30. In another embodiment, elongate body 15 is substantially cylindrical, and the average diameter of the first portion 10 is less than the average diameter of the second portion 30. However, other shapes and sizes of the dispenser body are contemplated, such as a cylindrical body or a body member that separates in the middle to form a hand hole for gripping. In certain aspects, the elongate body is contoured to conveniently fit within the hand of a user. The exterior surface of the elongate body can further includes a textured surface and/or bumps to assist the user in gripping the dispenser. In addition, the elongate body can include a handle (not shown). The handle may be similar to handles typically used on coffee cups. The handle can be physically coupled to the elongate body or removable.

Figure 2:
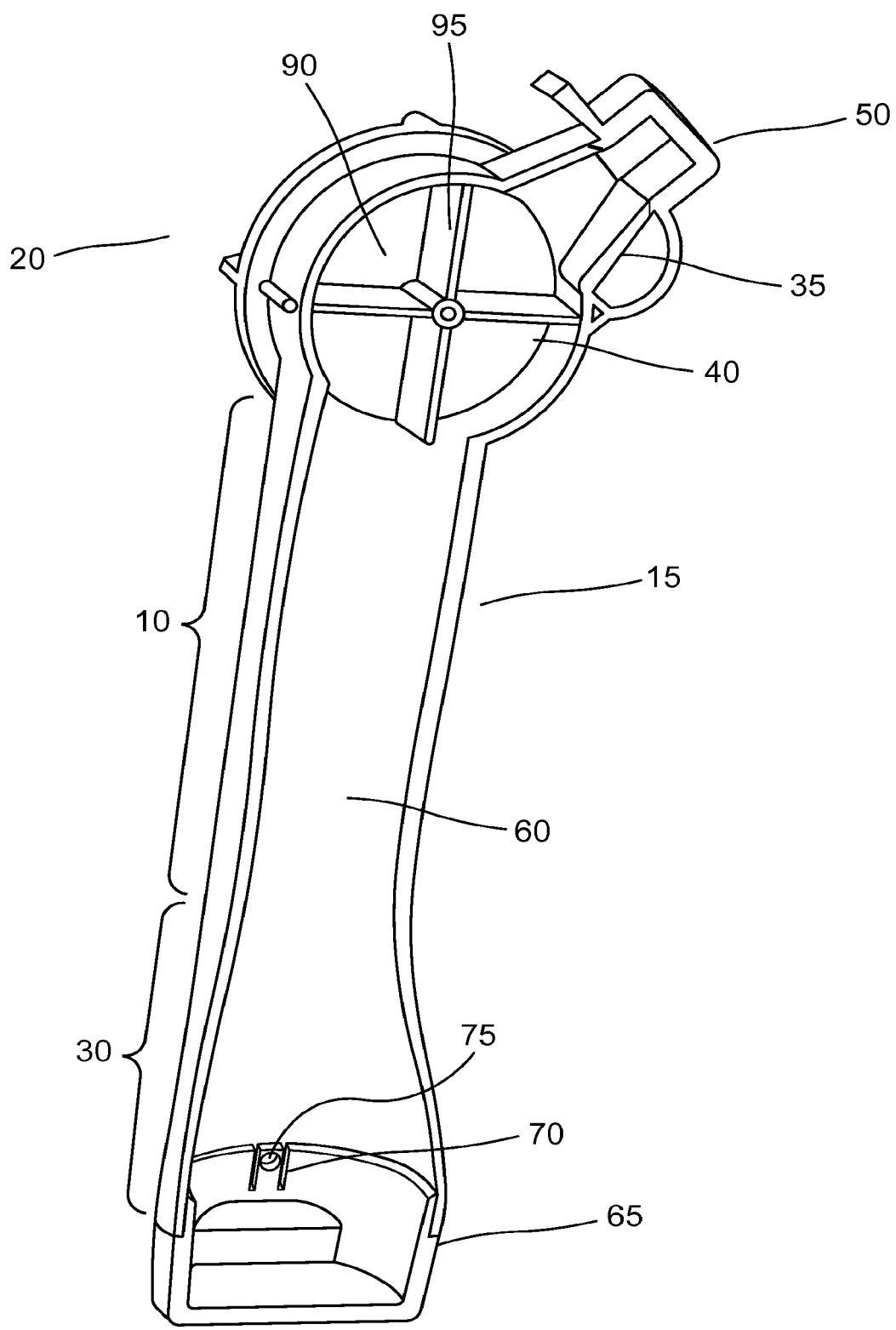
FIG. 2 depicts a cross-section of a dispenser according to one embodiment.
Figure 10:
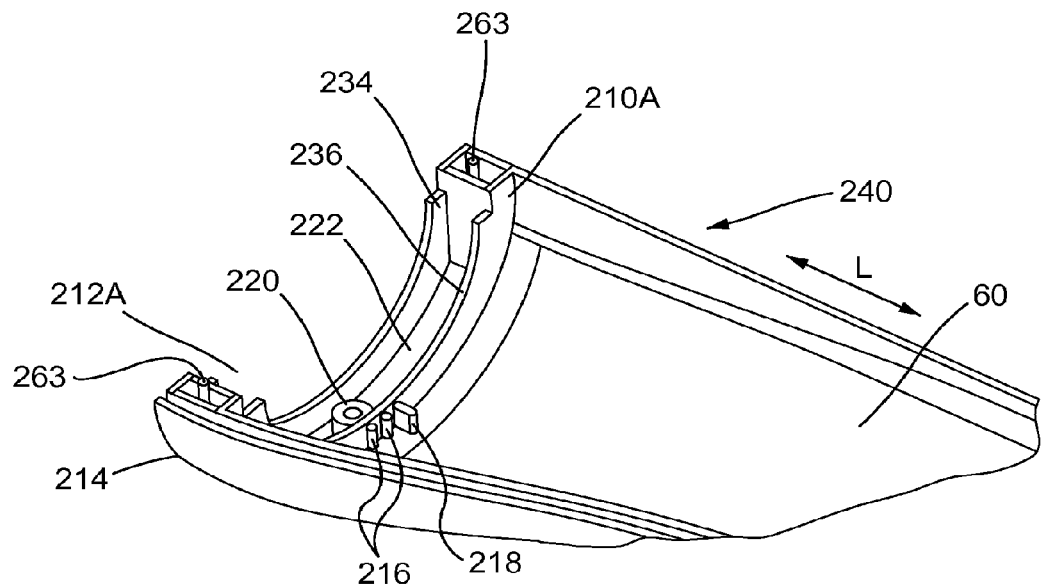
FIGS. 10-11 depict cross-sections of a proximal end of the dispenser according to certain embodiments.
Figure 11:
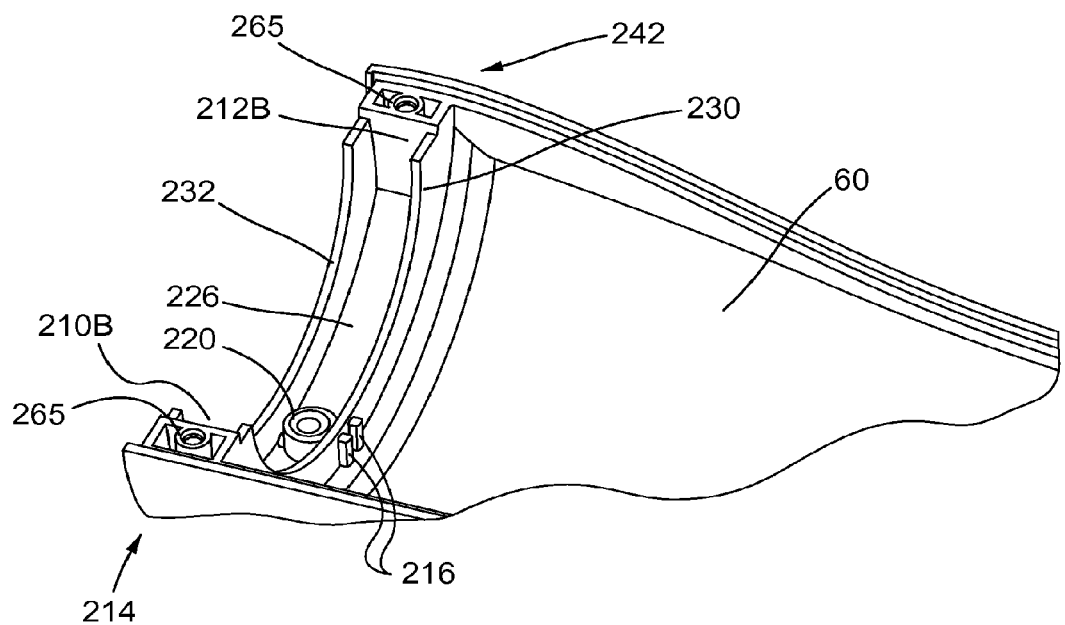

The elongate body 15 of the dispenser 100 may be formed by multiple pieces or as a unitary piece. In certain embodiments, the elongate body includes two separate pieces ("cross-sections") that are designed to mate-fit with each other. The cross-sections may include one or more posts 263 and one or more holes 265 that locate and guide placement of the cross-sections during welding, such as ultrasonic welding (See FIGS. 10-11). While the posts 263 and holes 265 are shown at the lower portion 30 of the dispenser, it is understood that they may also be located at positions along the length of the elongate body. FIGS. 2, 10, and 11 illustrate the cross-sections of the elongate body 15 as mated together.

FIG. 2 shows a cross-section of the dispenser according to certain embodiments. During assembly, this cross-section may be mated with another substantially mirrored cross-section to form the dispenser. As shown in FIG. 2, the elongate body 15 defines a lumen 60 for containing a substance, such as powdered substance. The dispenser also includes an internal wheel 40 within the dispensing housing 20. The internal wheel 40 dispenses specific portions of a substance begin held in the lumen 60 out of the spout 35.

Figure 14:
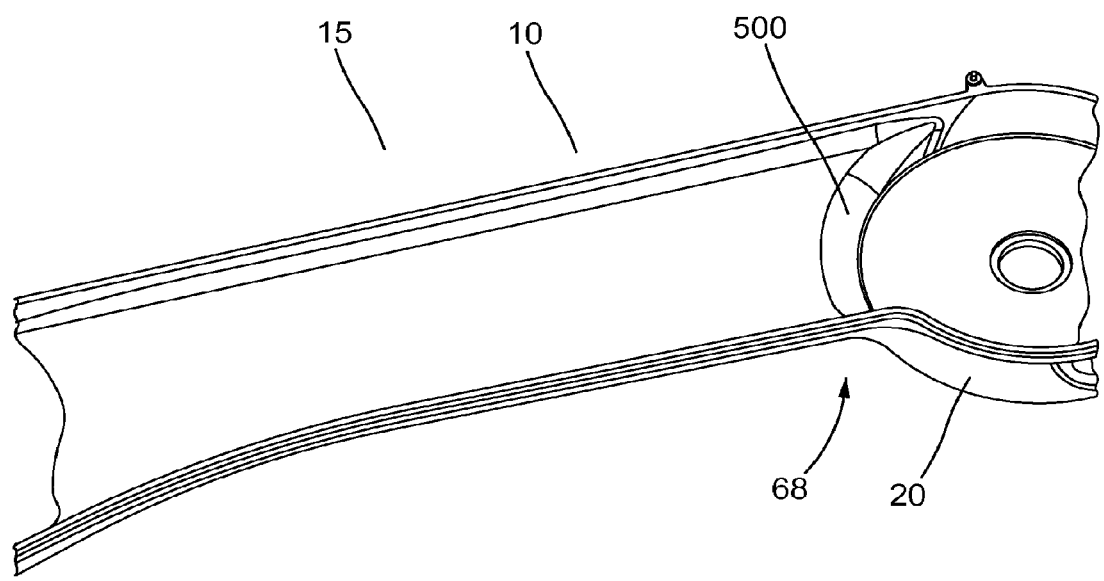
FIG. 14 illustrates a cross-section of the dispenser according to certain embodiments.

The first portion 10 of the elongate body 15 is associated with the dispensing housing 20 at a junction 68 (See FIGS. 1 and 14). The junction 68 is further illustrated in FIG. 14, which shows the dispenser 100 without the internal wheel 40. As shown in FIG. 14, the interior surface 500 of the junction 40 between the dispenser housing 20 and first portion 10 of the elongate body 15 is tapered. The tapered interior surface 500 allows substances to smoothly flow from the lumen 60 into the dispenser housing 20.

The interior of the elongate body 15 can be smooth, rough, or both. In certain aspects, the interior is textured to reduce clumping of the substance within the dispensing. The interior surface can also include sifting members, such as thin pin-like members extending into the lumen of the elongate body, that interact with the substances to sift and break the substance up within the elongate body when the bottle is angled or turned upside down.

Figure 8:
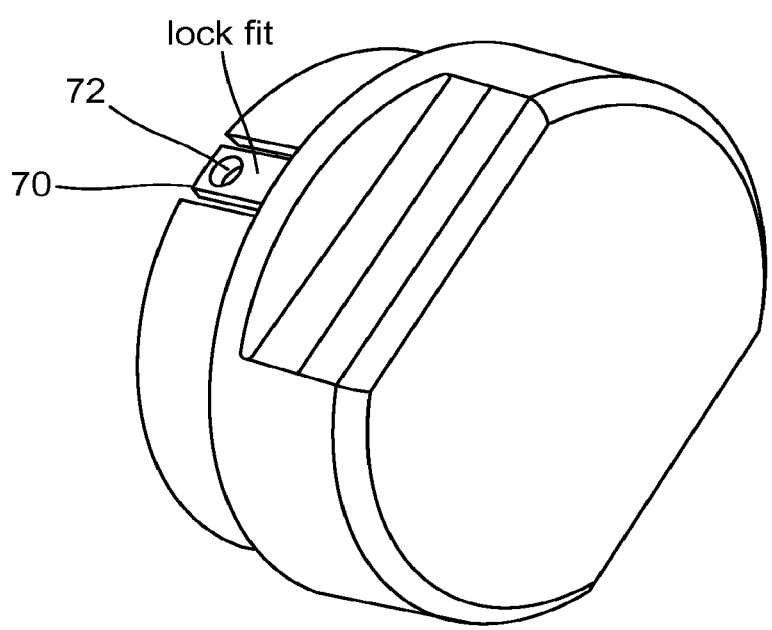
FIG. 8 depicts a removable bottom according to one embodiment.

As shown in FIGS. 1 and 2, a proximal end 214 of the second portion 30 is coupled to a removable bottom 65. According to certain aspects, the removable bottom 65 mates with the elongate body 15 via a snap-fit mechanism. In such aspect, the removable bottom 65 includes one or more flexible tabs 70 that associate with one or more protrusions 75 on the interior surface of the elongate body. This allows the removable bottom 65 to snap fit onto the second portion. FIG. 8 depicts the removable bottom having the flexible tab 70 with an opening 72 to engage with one or more protrusions 75. The removable bottom can be flexible or rigid. In certain embodiments, the removable bottom 65 includes grips that allow a user to easily remove the bottom 65 from the dispenser 100. In addition to the snap-fit coupling, any other means for coupling the removable bottom to the dispenser is contemplated, including a screw on bottom.

Figure 9:
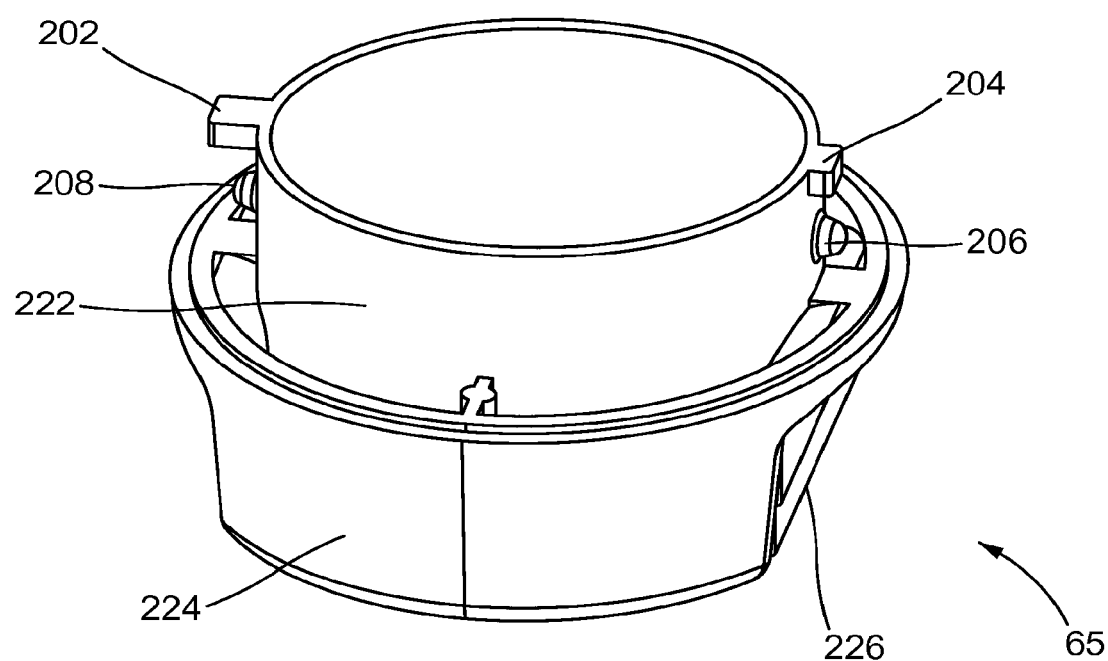
FIG. 9 depicts a removable bottom according to another embodiment.

In additional aspects, the removable bottom 65 mates with the proximal end 214 via a twist coupling mechanism. FIG. 9 illustrates a removable bottom 65 with elements for the twist coupling mechanism, and FIGS. 10-11 illustrate the proximal end 214 with corresponding elements for the twist coupling mechanism.

As shown in FIG. 9, the removable bottom 65 includes a base portion 224 and a top portion 222 extending from the base portion 224. In certain embodiments, the top portion 222 has a smaller cross section or diameter than the base portion 224. The top portion 222 is sized to fit within the proximal end 214 (See FIGS. 10-11) of the elongate body 15. The top portion 222 of the removable bottom 65 may include one or more coupling elements. Typically, the one or more coupling elements of the top portion 222 are male coupling elements that mate and lock into place with one or more female coupling elements on the proximal end 214 of the elongate body 15.

In some embodiments, male coupling elements of the top portion 222 include one or more lips (or tabs) 202, 204. The one or more lips 202, 204 are protrusions (such as rectangular protrusions) that extend outwardly away from a surface of the top portion 222. The lips 202, 204 may be the same size or different sizes. As shown in FIG. 9, the lips 202, 204 are positioned at a distal edge of the top portion 222. Alternatively, the lips 202, 204 may be positioned along the length of the top portion (i.e. midsection). In other embodiments, the male coupling elements of the top portion 222 include one or more posts 206, 208. The posts 206, 208 are typically semi-circular in shape and extend outwardly away from a surface of the top portion. The one or more posts 206, 208 may be the same size or different. As shown in FIG. 9, the posts 206, 208 are positioned along a length of the top portion 222 between the distal edge and the base portion 224.

Both the lips 202, 204 and the posts 206, 208 are designed to mate-fit corresponding female coupling elements of the proximal end 214 of the elongate body 15. The coupling elements of the proximal end 214 are described in more detail hereinafter. Because the lips 202, 204 and posts 206, 208 mate/couple with corresponding elements on the elongate body 15, it is understood that the positions of the lips 202, 204 and/or the posts 206, 208 on the top portion 222 may be changed so long as the corresponding elements of the bottom end 214 are likewise changed.

Figure 13:
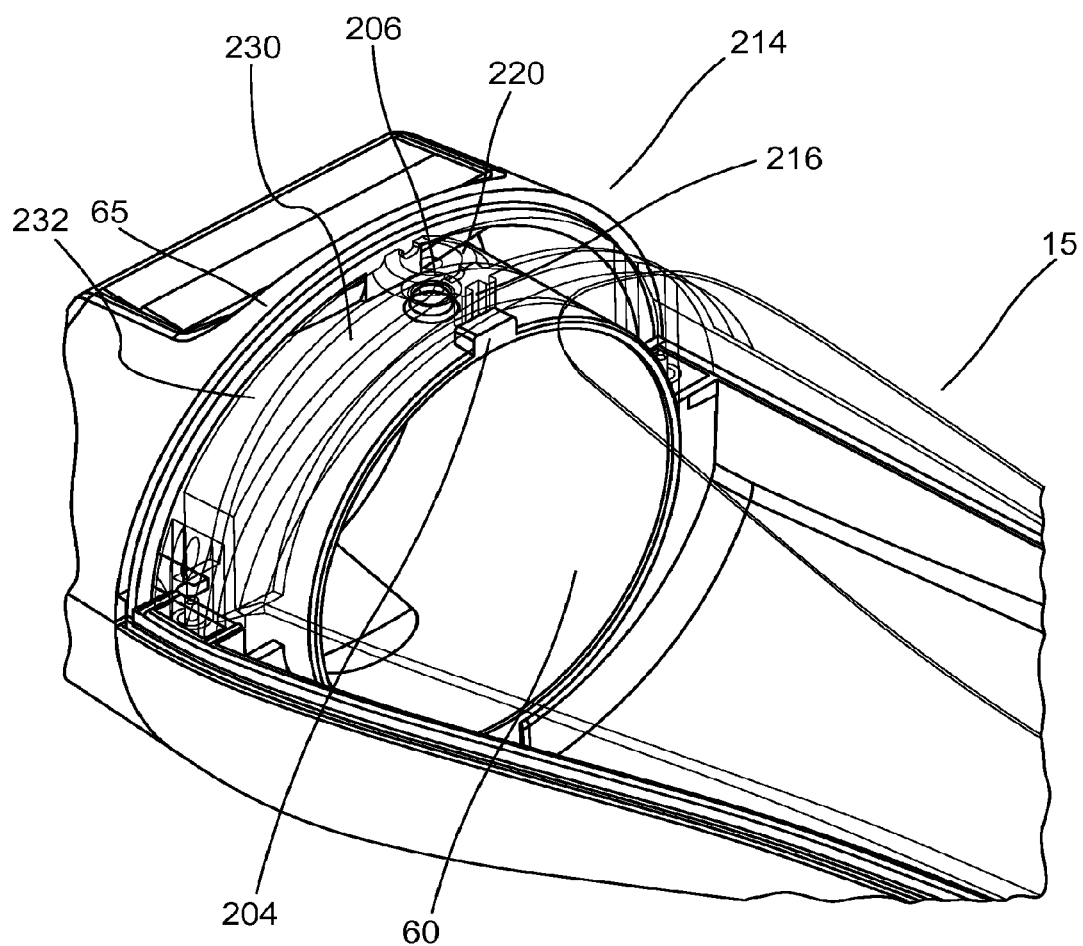
FIG. 13 illustrates a see-through three-dimensional view of the proximal end of the dispenser according to certain embodiments.

FIGS. 10 and 11 illustrate a proximal end 214 of the elongate body 15 designed to mate fit with the removable bottom 65 for dispensers of the invention with a twist coupling mechanism. FIG. 10 shows the proximal end 214 of a first cross-section 240 of the elongate body 15, and FIG. 11 shows the proximal end 214 of a second cross-section 242 of the elongate body 15. As discussed above, the second cross-section 242 is opposite from and mates with the first cross section 240 when the dispenser 100 is assembled. Alternatively, the cross-sections can be formed together as a unitary piece. The proximal end 214 of the elongate body 15 also defines the lumen 60 of the elongate body 15, and is configured to receive the top portion 222 of the removable bottom 65 (best shown in FIG. 13).

As discussed, the proximal end 214 of the elongate body 15 when designed for use with the twist coupling mechanism includes one or more female coupling elements that mate fit with one or more of the male coupling elements (lips 202, 204 and posts 206, 208) of the removable bottom 65. In certain embodiments, a coupling element of the proximal end 214 includes one or more walls 230, 236 that partially extend inward from an inner surface of each cross-section 240, 242, respectively. The walls 230, 236 include one or more ribs 216, which are raised bump-like elements on the distal surface on the walls 230, 236. Preferably, the walls 230, 236 each include a pair of ribs 216. The pairs of ribs 216 are designed to releasably mate with the lips 202, 204 of the removable bottom 65, when the removable bottom 65 is inserted into and rotated within the proximal end 214 of the dispenser 100. When twisting the releasable bottom 65 into a locked position, the lips 202, 204 are guided along the walls 230, 236, and pressure from the twisting motion forces the lips 202, 204 onto or between the ribs 216, thereby securing the releasable bottom 65 in place. As such, the lips 202, 204 mate with the pair of ribs 216 via a resistance fitting, and are removable from the ribs 216 by application of force. The ribs 216 and the lips 202, 204 may be collectively referred to as the rib/lip locking elements. In addition, the walls 230, 236 act as a path for the lips 202, 204 prior to mating with the ribs 216. In addition, the walls 230, 236 extend beyond lips 202, 204 to minimize longitudinal movement of the removable bottom 65 when it is inserted into and rotated within the proximal end 214 of the dispenser.

In certain embodiments, a stopper rib 218 is used in conjunction with one or more of the ribs 216. The stopper rib 218 is longer than the ribs 216 and has a length that prevents over-rotation of the releasable bottom 65. That is, the stopper rib 218 is sized such that the lips 202, 204 cannot pass the stopper rib even with application of force suitable to insert and release the lips 202, 204 into the pair of ribs 216. The stopper rib 218 also only permits locking when the bottom 65 is rotated in a certain direction. This feature minimizes user error and potential breaking of the plastic couplings of the dispenser (i.e. breaking pieces of the dispenser that are welded together). In addition, the stopper rib 218 alerts a user when the bottom is correctly twisted in place because if the cap is rotated in the wrong direction, the lips 202, 204 will not click into place on top of the ribs 216. This prevents inadvertent leakage of substance within the dispenser due to incorrect sealing of the removable bottom 65 to the elongate body 15. It is understood that the location of the stopper rib 218 can be chosen to require clockwise or counterclockwise rotation in order to click and seal the removable bottom 65 into place.

In additional embodiments, the female coupling elements of the proximal end 214 include one or more indents 220. The indents 220 are designed to releasably mate with the posts 206, 208 of the removable bottom 65, when the removable bottom 65 is inserted into and rotated within the proximal end 214 of the dispenser 100. The indents 220 provide resistance and stop rotation of the removable bottom 65 when the posts 206, 208 are rotated into the indents 220. The posts 206, 208 and the indents 220 are collectively referred to as the post/indent locking elements. The post 206, 208 may be removed from the indents 220 by application of rotational force, which thereby allows one to remove the releasable bottom 65. In other embodiments, the proximal end 214 also includes a first channel 226 formed by walls 230, 232, a second channel 222 formed by walls 234, 236, or both the first and second channels. The channels 226, 222 form paths for receiving posts 206, 208 of the removable bottom 65, when the removable bottom 65 is inserted into and rotated within the proximal end 214 of the dispenser. In embodiments that include channels 226, 222, the indents 220 are preferably disposed within the channels such that the channel paths lead the posts 206, 208 into the indents 220. In addition, the walls 230, 232, 234, 236 extend beyond posts 206, 208 to minimize longitudinal movement of the removable bottom 65 when it is inserted into and rotated within the proximal end 214 of the dispenser.

In certain embodiments, the one or more walls that form the channel are also the walls that guide the lips (e.g. walls 230, 236 in FIGS. 10-11).

The walls (e.g., 230, 232, 234, 236) extending from the inner surface of the proximal end may include one or more cutouts. The cutouts allow the posts and/or lips to pass through the walls prior to twisting and locking the releasable bottom 65 in place. The posts and/or lips should be aligned with the cut-outs in order for one to insert and remove the releasable bottom 65 into the proximal end 214. Without this alignment, the walls will prevent further movement of the bottom 65 in the L directions. The cut-outs used for the posts may be different than the cut-outs used for the lips. In addition, the cut-outs may be sized to fit lips/posts of certain sizes in order to force a user to align the lips/posts of certain sizes with their correspondingly shaped cutouts to remove or insert the releasable bottom 65.

Figure 12:
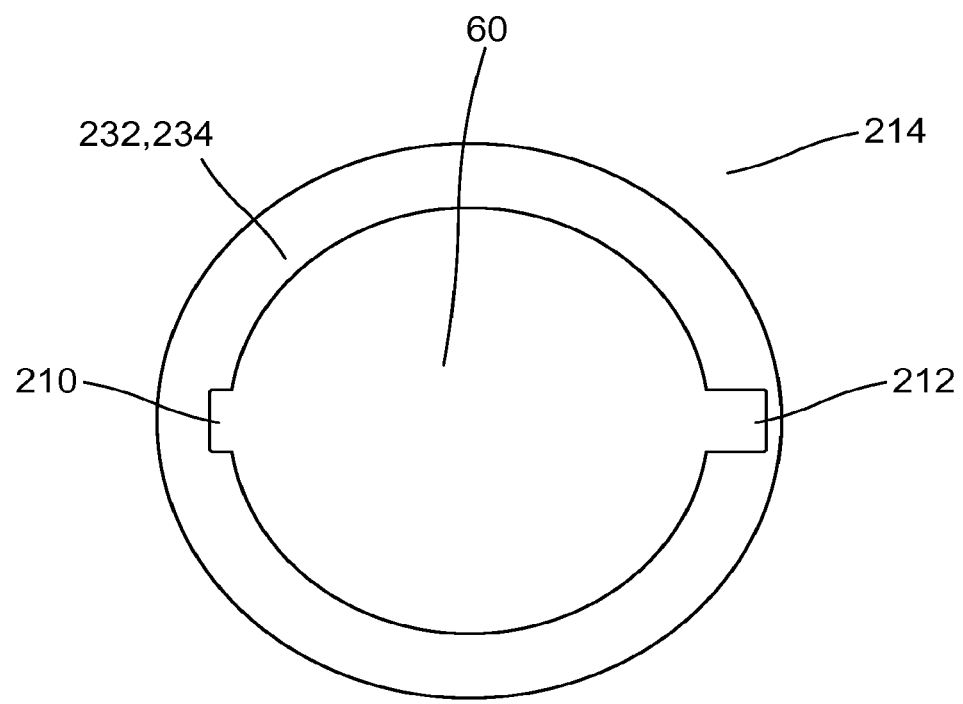
FIG. 12 illustrates a front view of the proximal end of the dispenser according to certain embodiments.

FIGS. 10-12 illustrate wall cut-outs according to certain embodiments. FIG. 12 illustrates a front view of the proximal end 214 with cut-outs 210, 212. As shown, the cut-outs 210, 212 for the posts and the lips are the same. In addition, the cut-out 210 is sized different from cut-out 212, thereby requiring a user to align the bottom such that the posts/lips are matched with the correspondingly shaped cut-outs. FIGS. 10 and 11 illustrate cutout halves 210A, 210B, 212A, 212B of each cross section 240, 242. The cutout halves form cutouts 210, 212 when the cross sections 240, 242 are coupled.

Preferably and as shown in FIGS. 9, 10, 11, the dispenser 100 includes a twist and dual lock mechanism. The twist and dual lock mechanism includes one or more rib/lip locking elements as well as one or more post/indent locking elements. The twist and dual lock mechanism also includes the channels 226, 222 that form the paths for receiving posts 206, 208. In addition, the walls 230, 236 of the channels act to guide the lips into the ribs. The twist and dual lock mechanism has several advantages. By using a combination of locking elements (rib/lip and post/indent), the dispenser is able to hold a variety of substances without risk of the removable bottom 65 unintentionally breaking free due to the weight of the substance. The channels 222, 226 guide the releasable bottom 65 into the locked position within the elongate body 15, thereby minimizing user error in forming a complete seal. Further, the walls of the channels 222, 226 provide a dual barrier from substances (such as powder) leaking from the bottom 65 when coupled to the elongate body 15.

FIG. 14 illustrates the duel lock mechanism with the bottom 65 locked into the proximal end 214 of the elongate body 15. The removable bottom 65 provides a means for introducing a substance into the dispenser 100 for storage. When a substance is placed into the dispenser 100 and the removable bottom 65 is attached, the dispenser 100 is substantially air tight to prevent exposing any contained substance to humidity. In a preferred embodiment, the removable bottom (as shown in either FIG. 8 or FIG. 9) is sized and shaped to form a base for allowing the dispenser to stand up (i.e. in a manner that only the base is in contact with the surface and the body of the dispenser extends vertically from the base and the contact surface). In an alternative embodiment, the dispenser bottom is not removable from the second portion, but rather the second portion forms the bottom and base for standing the dispenser.

The dispensing housing 20 of the dispenser 100 can be formed as part of the dispenser or can be a removable member that is attached to the dispenser. If removable, the dispensing housing 20 can be coupled to the dispenser 100 using any conventional means, such as screw-on means or snap-fit means.

Figure 7:
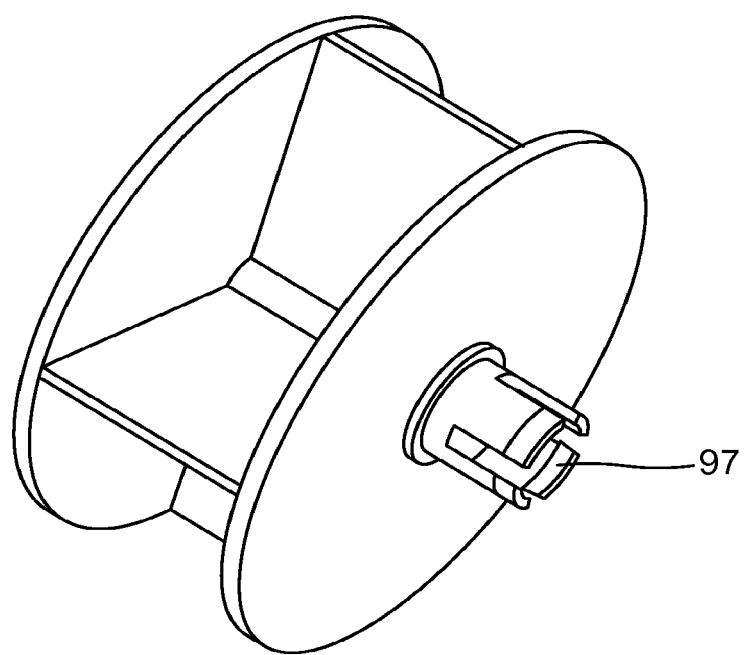
FIG. 7 depicts an internal wheel according to one embodiment.

In certain aspects, the dispensing housing 20 includes an internal wheel 40 for rotating and creating measured portions of substance to dispense (as shown in FIG. 2). The internal wheel as disposed within the dispensing housing 20 is shown in FIG. 2. FIG. 7 shows a close-up of the internal wheel outside of the internal housing. The internal wheel 40 includes a shaft 97 that can be operably associated with the external knob 25, which enables rotation of the internal wheel 40 by the external knob 25. The shaft 97 of the internal wheel defines and/or forms the axis of the internal wheel and is perpendicular to a longitudinal axis of the elongate body and a longitudinal axis of the spout. The shaft 97 can also function to maintain the position of the internal wheel 40 within the dispensing housing 20. The internal wheel 40 includes a plurality of compartments 95 of a certain volume. In one aspect, the internal wheel 40 includes a plurality of blades 95 that form compartments 90 of a certain volume to hold that amount of substance. In one embodiment, the blades 95 are equally-spaced apart such that each compartment 90 defines the same volume.

The size of the compartments 90 can be made to match common volume measurements for making a drink. For example, if baby formula typically requires 2 tablespoons of formula per mL of water, the internal wheel 40 can be designed such that each compartment holds exactly 2 tablespoons of formula.

In one aspect, the internal wheel is replaceable so that a user can pick and use one of a variety of internal wheels based on the type of substance the user wishes to store and dispense from the formula bottle. For example, the dispenser can come with several loadable internal wheels, in which each internal wheel is designed to dispense exact measurement for a specific drink or product, such a wheel having compartments sized for baby powder and a wheel having compartments sized for a protein shake powder. In such aspect, a portion of the dispensing housing 20, such as a side having the external knob attached or a side not having the external knob attached, is configured to allow a user access into the dispensing housing 20 to change the internal wheel. For example, a side of the dispensing housing 20 can include a hinge and a closing mechanism, such as a latch, that allows a user to open and close the side at will.

In one embodiment, the end of each blade of the internal wheel is configured to slideably flush against an interior surface of the dispensing housing at some point during rotation of the internal wheel. This advantageously reduces the amount of air/humidity exposed to the substance held within the elongate body and ensures that the compartments contain the specific volume of the contained substance. The internal wheel is located such that a portion of the internal wheel is in communication with the spout and a portion of the internal wheel is in communication with the lumen of the elongate body. In addition, this flush fit of the blades allows the internal wheel to form precise measurements of substance within the compartment because the internal surface acts to level off extra substance and to contain the level substance within the compartment as the internal wheel rotates the compartment from facing the lumen of the elongate body to the spout opening.

The dispensing housing further includes an external knob 25. The external knob 25 as shown in FIG. 1 is located on a side of the dispenser, but the external knob 25 can be located anywhere on the dispensing housing that is accessible by a user. Preferably, the external knob is located such that the user can manipulate the external knob with the same hand as the holding the dispenser. The external knob can be a rotational element or a lever member. In one aspect, the external knob 25 is operably associated with the internal wheel 40 such that movement of the external knob 25 translates into rotation of the internal wheel 40. In certain embodiments, a center cutout 99 (FIG. 6) of the external knob 25 mates/couples with the shaft 97 (FIG. 7) of the internal wheel 40.

Figure 3:
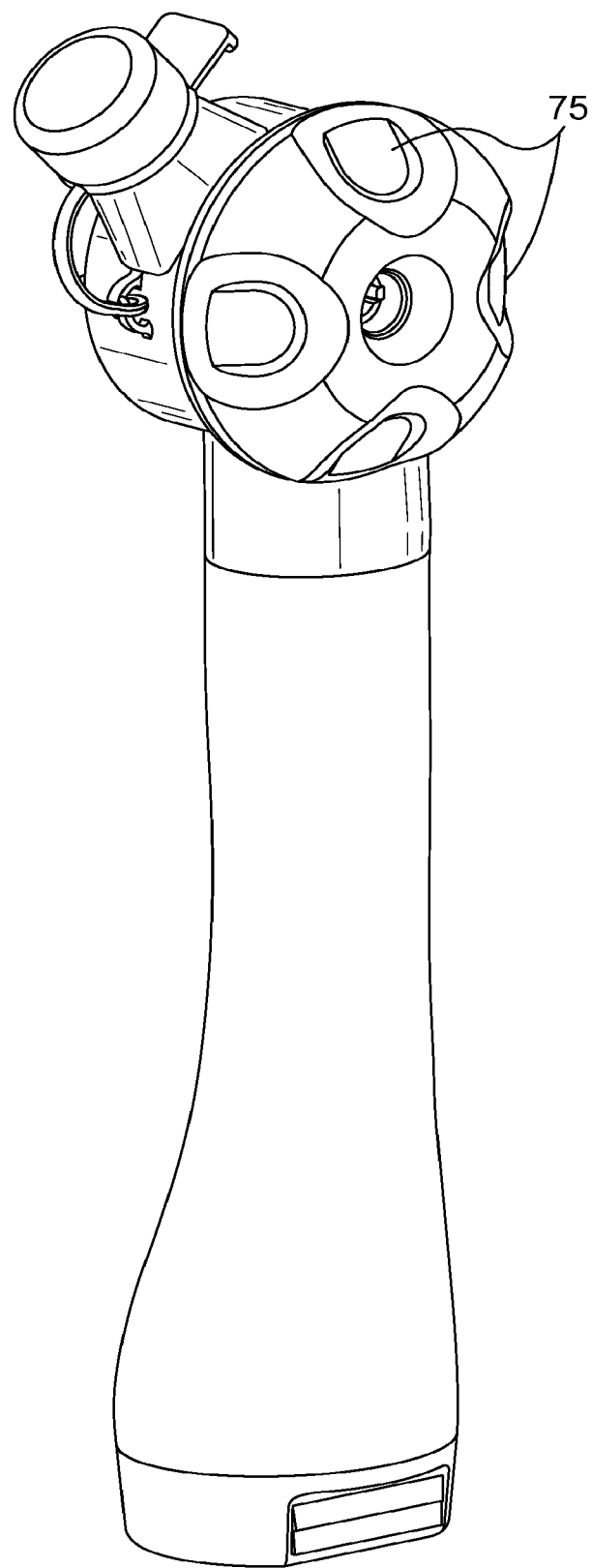
FIG. 3 depicts a dispenser according to another embodiment.
Figure 4:
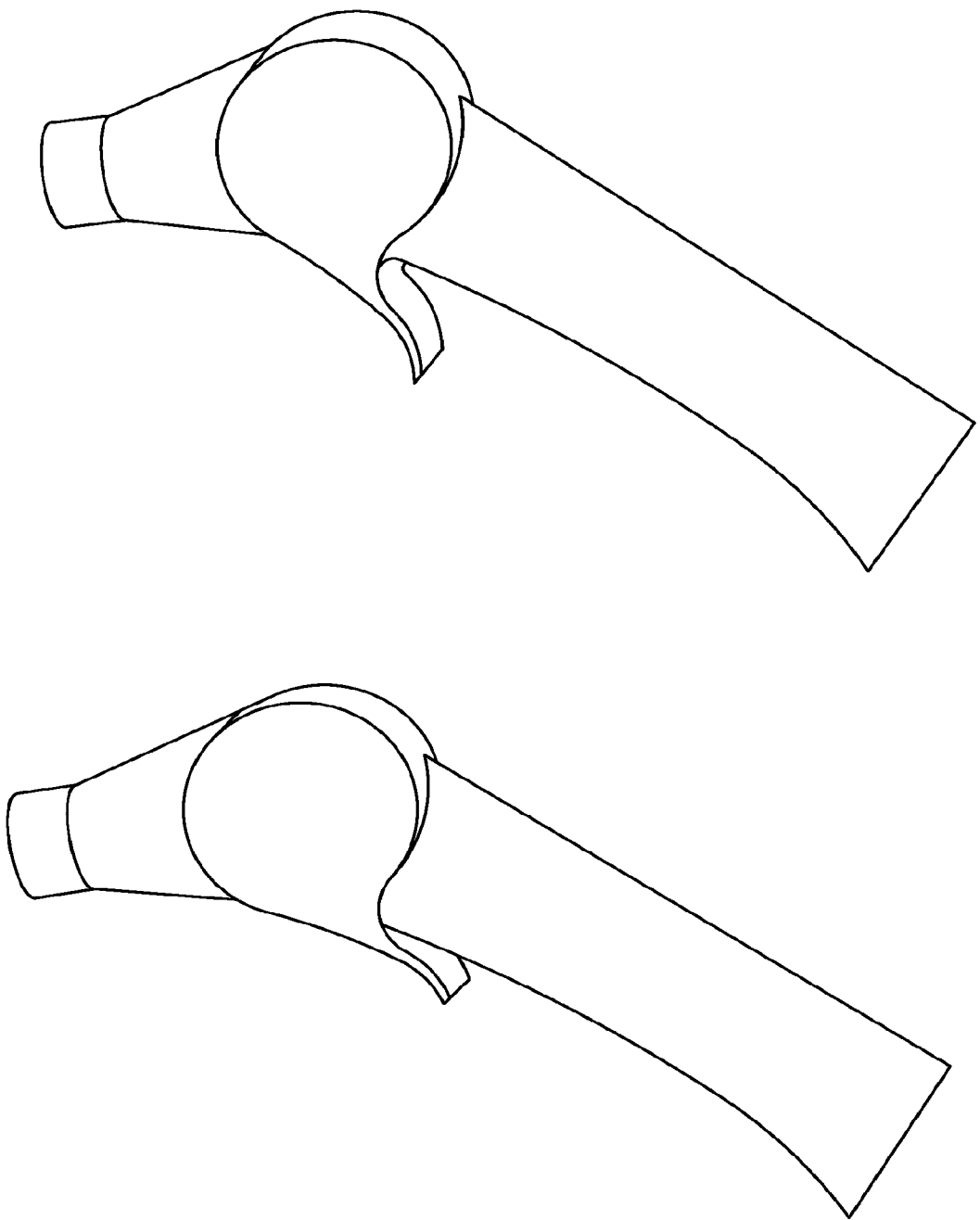
FIG. 4 depicts a dispenser according to another embodiment.
Figure 5:
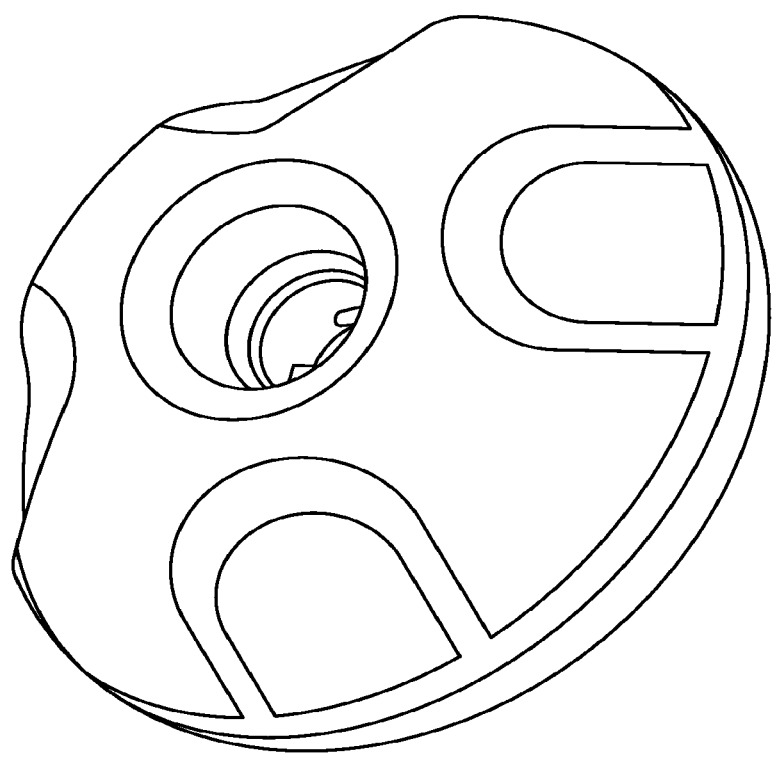
FIG. 5 depicts an external knob according to one embodiment.
Figure 6:
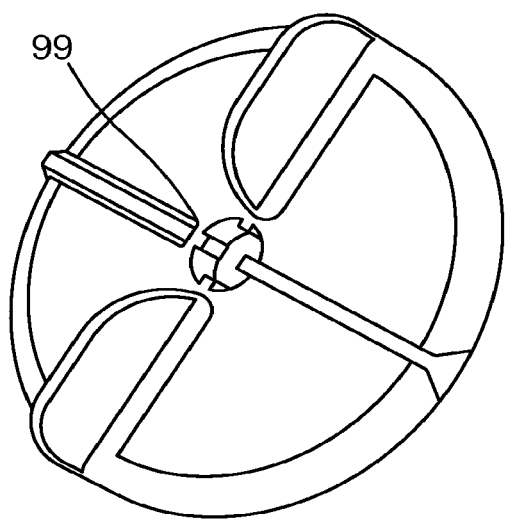
FIG. 6 depicts an external knob according another embodiment.

FIG. 1 depicts the external knob as a rotational element. As shown in FIG. 1, the external knob 25 includes gripping members 75 that provide a grip for a user to easily rotate the external knob 25. FIG. 6 depicts a close-up of the external knob shown in FIG. 1. The gripping members 75 can include a shape or texture that allows a user to easily move or rotate the external knob 25. In the preferred embodiment, the external knob is positioned and shaped such that a user can move the external knob with his/her thumb. The gripping members 75, in FIG. 1, are spaced-apart protrusions shaped to fit the contours of a user's thumb. The gripping members 75, as shown in FIG. 3, are indents in the external knob that allow a user to place their fingers or thumb within the indents to provide friction and leverage for rotation. FIG. 5 depicts a close-up of the external knob shown in FIG. 3. FIG. 4 depicts an alternative dispenser 100 having a lever member as an external knob 25. The lever member may mate with the shaft 97 of the internal wheel 40. In this embodiment, the internal wheel 40 rotates upon squeezing the lever.

In certain aspects, a detent can be used to provide resistance during dispensing and to control the amount of rotation. The detent can be operably associated with the external knob or the internal wheel. In one embodiment, the detent provides resistance and a sound each time a compartment 90 delivers a measured amount of substance out of the spout. That is, the detent alerts the user that the internal wheel 40 moved a fixed arc distance sufficient to deliver one compartment 90 of substance into and out of the spout. The fixed arc distance can be, for example, the distance between each blade 95 of the internal wheel 40.

The dispensing housing further includes a spout which defines an opening. The spout is configured to deliver the substance in a clean and precise manner out of the dispensing device and into a container, such as a formula bottle. The substance is dispensed out of the spout opening. In one embodiment, the spout extends outwardly from the dispensing housing and is positioned at an angle with respect to the elongate body. This allows a user to position the spout downwards so that the spout opening is facing the opening of a container directly benefit the spout without having to completely invert dispenser. In one aspect, the spout is designed to fit into the opening of most drink bottles and formula bottles, which allows one to place the spout into the opening of a bottle prior to and while dispensing the substance. This ensures that dispensed substance is entirely transferred into the bottle and eliminates the mess typically associated with using a measuring spoon.

For operation, a user first loads a dispenser of the invention with a substance into the lumen of the elongate body, which is accomplished by removing the removable cap and pouring the substance into the dispenser for storage and dispensing. For dispensing a loaded dispenser, a user grabs the elongate body with one hand and tilts the dispenser at a downward angle so that the spout opening is disposed within an opening of a vertical container standing upright. This causes the substance within the dispenser to move downward towards the internal wheel due to gravitational force. The gravitational force causes the substance to fill a compartment facing the lumen of the elongate body. To form precise measurements of the substance, the user should rotate the external wheel while the dispenser is in the tilted position. As the internal wheel rotates within the dispensing housing, the compartment facing the elongate body moves towards the spout and the blades, which form the compartment, flush against the internal surface of the dispensing housing to level and partition a precise measurement of substance within the compartment. Once a first blade of the compartment passes the interior surface of the dispensing housing so that at least a portion of the compartment is open towards the spout, gravity causes the substance to move out the compartment, through spout, and into the container. The substance will move out of the compartment in a controlled rate because the compartment gradually opens to the spout during rotation. When the substance is fully dispensed out of the compartment and into the container, the rotating internal wheel will engage with the detent, which provides resistance to the external wheel and makes a sound to alert the user that one measurement of substance was delivered out of the dispenser.

The dispenser and the components that form the dispenser can be plastics, metals, glass and combinations thereof. The plastics can include Polyethylene terephthalate (PET), Polyethylene (PE), High-density polyethylene (HDPE), Polyvinyl chloride (PVC), Polyvinylidene chloride (PVDC), Low-density polyethylene (LDPE), Polypropylene (PP), Polystyrene (PS), High impact polystyrene (HIPS), ect. Preferably, the plastic or combination of polymers that form the dispenser are approved for use as a dispenser of food/beverage product by a regulatory body.

The invention is useful for providing controlled and measured dispensing of substances. Any substance (e.g. whether it be fluid, solid, powerered, gel) may be dispensed from the dispenser of the invention. Examples of substances include coffee, spices, baby formula, flour, drink mixes, sugar, etc.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A dispenser comprising:
    an elongate body defining a lumen for holding a substance and having a first portion and a second portion, wherein an average width of the first portion is less than an average width of the second portion, wherein an interior surface of the elongate body is configured to sift the substance within the elongate body;
    a removable bottom operably associated with an end of the second portion;
    a dispensing housing operably associated with the first portion, wherein the dispensing housing includes an external knob and a spout;
    an internal wheel having an axis and disposed within the dispensing housing such that the internal wheel is in communication with the spout and the lumen of the elongate body, wherein the axis of the internal wheel is perpendicular to a longitudinal axis of the elongate body and a longitudinal axis of the spout, wherein the internal wheel comprises a plurality of spaced-apart blades that define compartments for receiving and holding the substance and an outer edge of each blade is configured to be slidably flush against an internal surface of the dispensing housing at some point during rotation of the internal wheel, wherein the external knob of the dispensing housing is configured to engage with the internal wheel such that movement of the external knob translates into rotation of the internal wheel; and
    a detent configured to engage with the internal wheel or external knob, during rotation of the internal wheel, to indicate with resistance and sound that one of the compartments released the substance held within the one of the compartments into the spout.

2. The dispenser of claim 1, wherein the longitudinal axis of the spout is at an angle with respect to the longitudinal axis of the elongate body.

3. The dispenser of claim 1, wherein the substance is baby powder.

4. The dispenser of claim 1, wherein the removable bottom snap-fits into the second portion.

5. The dispenser of claim 4, wherein the removable bottom includes at least one flexible tab that mates with at least one protrusion on the second portion to produce a snap-fit connection.

6. The dispenser of claim 1, further comprising a cap for closing the spout.

7. The dispenser of claim 1, wherein the dispensing housing detachable from the elongate body.

8. A dispenser comprising:
an elongate body defining a lumen for holding a substance and having a first portion, a second portion, and a proximal end, wherein an average width of the first portion is less than an average width of the second portion;
a removable bottom operably associated with the proximal end of the elongate body, wherein:
  the removable bottom comprises a lip and a post,
  the proximal end comprises a pair of ribs, at least two walls forming a channel, and an indent positioned within the channel, and
  the lip and post mate with the pair of ribs and the indent, respectively, when the removable bottom is inserted into and rotated within the proximal end, thereby locking the removable bottom in place;
a dispensing housing operably associated with the first portion, wherein the dispensing housing includes an external knob and a spout; and
an internal wheel having an axis and disposed within the dispensing housing such that the internal wheel is in communication with the spout and the lumen of the elongate body, wherein the axis of the internal wheel is perpendicular to a longitudinal axis of the elongate body and a longitudinal axis of the spout, wherein the internal wheel comprises a plurality of spaced-apart blades that define compartments for receiving and holding the substance and an outer edge of each blade is configured to slidably flush against an internal surface of the dispensing housing at some point during rotation of the internal wheel, wherein the external knob of the dispensing housing is configured to engage with the internal wheel such that movement of the external knob translates into rotation of the internal wheel.

* * * * *